United States Patent
Rogers et al.

(10) Patent No.: US 11,663,687 B2
(45) Date of Patent: May 30, 2023

(54) SHIPPING CONTAINER SCHEDULING USING QUADRATIC UNCONSTRAINED BINARY OPTIMIZATION

(71) Applicant: SavantX, Inc., Jackson, WY (US)

(72) Inventors: Michael L. Rogers, Los Alamos, NM (US); Robert L. Singleton, Santa Fe, NM (US)

(73) Assignee: SavantX, INC., Jackson, WY (US)

( * ) Notice: Subject to any disclaimer, the term of this patent is extended or adjusted under 35 U.S.C. 154(b) by 0 days.

(21) Appl. No.: 17/482,254

(22) Filed: Sep. 22, 2021

(65) Prior Publication Data

US 2023/0086607 A1  Mar. 23, 2023

(51) Int. Cl.
| | | |
|---|---|---|
| G06Q 50/28 | (2012.01) |
| G06F 17/11 | (2006.01) |
| G06Q 10/08 | (2023.01) |
| G06Q 10/04 | (2023.01) |

(52) U.S. Cl.
CPC .............. G06Q 50/28 (2013.01); G06F 17/11 (2013.01); G06Q 10/04 (2013.01); G06Q 10/08 (2013.01)

(58) Field of Classification Search
CPC ........ G06Q 50/28; G06Q 10/04; G06Q 10/08; G06F 17/11
USPC .......................................................... 705/330
See application file for complete search history.

(56) References Cited

U.S. PATENT DOCUMENTS

2018/0025318 A1* 1/2018 Baggott ............... G06Q 10/047
  705/334

OTHER PUBLICATIONS

"Genetic Algorithms Solution For Unconstrained Optimal Crane Control" Published by IEEE (Year: 2002).*
Wikipedia; "Quadratic unconstrained binary optimization"; retrieved from https://en.wikipedia.org/w/index.php?title=Quadratic_unconstrained_binary_optimization&oldid=1020700695; Apr. 30, 2021; downloaded May 27, 2021; 4 pages.

* cited by examiner

Primary Examiner — Zeina Elchanti
(74) Attorney, Agent, or Firm — Fitch, Even, Tabin & Flannery LLP

(57) ABSTRACT

Methods and systems for establishing and solving an optimization problem involving trade-offs in a container delivery system (e.g., trade-offs at least between prioritizing crane movement and prioritizing the wait time for trucks that have already arrived in a port) are described. According to some aspects of the described techniques, a cost function of the optimization problem reflects both of these concerns (e.g., a cost function is described that penalizes crane movement, rewards clearing of containers, etc.). Among other advantages, the methods and systems described may result in increased port operation efficiency, improved container flow, etc.

4 Claims, 9 Drawing Sheets

SHIPPING CONTAINER SCHEDULING USING QUADRATIC UNCONSTRAINED BINARY OPTIMIZATION

BACKGROUND OF THE INVENTION

1. Field of the Invention

The present invention relates generally to logistics management, and more specifically to shipping container scheduling using quadratic unconstrained binary optimization (QUBO).

2. Discussion of the Related Art

Various systems and processes are known in the art for shipping container scheduling using QUBO.

Containers (e.g., freight containers) may be used to transport cargo and goods from one location to another. For example, containers can be stowed in specially designed holds and/or on the decks of barges or ships. For land transportation, containers may be stacked on flatbed railroad cars, trucks, etc.

Port facilities (e.g., seaports, etc.) have been established at various locations to facilitate container transfers to different transportation methods (e.g., from sea transportation by ship to land transportation by truck). For instance, ports may include cranes strategically positioned to facilitate such transfer of containers. In some aspects, ports may act as multimodal distribution hubs, with transport links using road routes, rail routes, sea routes, river routes, canal routes, air routes, etc.

As an example, container stacks may be arranged in long rows and some number of containers may fit (or be loaded from) various "bay" positions along a row. Appointments may be set for incoming trucks to arrive to pick up specific containers located at specific bay positions. The containers are loaded onto the trucks via large movable cranes (e.g., Rubber Tire Gantries (RTGs)) that straddle the rows and move along them.

Crane movement is an expensive operation. Further, it is also undesirable to make truckers wait in port too long (e.g., in some cases, some trucks may be left overnight from a previous day). Techniques for efficient crane operation and container loading to save energy and expenses may be desired.

SUMMARY

A method, apparatus, non-transitory computer readable medium, and system for controlling crane movement are described. One or more aspects of the method, apparatus, non-transitory computer readable medium, and system include receiving a schedule of probable truck arrival times; determining probable future truck arrival times as a function of the schedule; detecting a truck within a predefined proximity of an operating area, wherein the truck is assigned a container; determining a container location of the container; determining a crane location of a crane proximate to the container; assigning the container to the crane; and determining, using a quadratic unconstrained binary optimization system, wherein the quadratic unconstrained binary optimization system solves a non-deterministic polynomial time problem, an order to serve the container for the crane as a function of cost and service objectives.

In some examples, determining the order to serve the container for the crane as a function of cost and service objectives comprises: determining an initial guess of the order to serve, determining a plurality of weights based on the initial guess, determining a plurality of strengths as a function of a stiffness factor, determining a plurality of biases as a function of the plurality of weights and the plurality of strengths, and generating a revision of the order to serve as a function of the initial guess and the plurality of weights.

One or more aspects of the method, apparatus, non-transitory computer readable medium, and system further include determining, repeatedly, a number of trucks in a queue for the crane; determining, repeatedly, a set of available queue slots for the crane by comparing the number of trucks in the queue with a queue size; ordering the queue, wherein the ordering defines a path vector for movement of the crane as a function of locations of containers assigned to trucks in the queue; selecting, repeatedly, a lowest order truck from the set of available queue slots and not yet called to the crane; transmitting, when the truck is the lowest order truck, a call message to the truck, wherein the call message includes the container location; moving, when the truck is the lowest order truck, the crane to the container location; and delivering, in response to the truck arriving at the container location, the container to the truck using the crane.

An apparatus, system, and method for controlling crane movement are described. One or more aspects of the apparatus, system, and method include a location receiver configured to receive a location signal from a location sensor coupled to a truck, wherein the location sensor detects a truck location of the truck within a predefined proximity of an operating area and generates the location signal in response to the truck location; a data storage system coupled to the location sensor, wherein the data storage system receives the truck location, wherein the data storage system comprises a container location for a container assigned to the truck; a loading queue coupled to the data storage system, wherein the loading queue comprises a list of trucks located with the predefined proximity, wherein the list of trucks comprises the truck, wherein the list of trucks is ordered from a lowest order truck to a highest order truck; and a processing system coupled to the loading queue comprising a quadratic unconstrained binary optimization system.

In some examples, the quadratic unconstrained binary optimization system solves a non-deterministic polynomial time problem configured to determine an order for the list of trucks and update the order in response to receipt of the truck location, wherein the order defines a path vector for movement of the crane as a function of locations of containers assigned to trucks on the list of trucks, and wherein determining the order for the list of trucks comprises: determining an initial guess of the order to serve, determining a plurality of weights based on the initial guess, determining a plurality of strengths as a function of a stiffness factor, determining a plurality of biases as a function of the plurality of weights and the plurality of strengths, and generating a revision of the order to serve as a function of the initial guess and the plurality of weights.

One or more aspects of the apparatus, system, and method further include a crane communication system coupled to the processing system configured to communicate to a crane communications device onboard the crane when the truck is the lowest order truck, wherein a crane communication to the crane communications device directs the crane to load the container when the truck arrives at the crane; and a truck communication system coupled to the processing system configured to communicate to a truck communications device onboard the truck when the truck is the lowest order truck, wherein a truck communication to the truck communications device onboard the truck indicates that the truck should proceed to the crane.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Given a sequence of binary choices over time with a local-in-time cost function based on either deterministic or stochastic state information with known probability distributions, one can represent a statistically optimal sequence for the long-term cost function as the solution to a QUBO problem. According to techniques described herein, optimization problems may be approximated as a QUBO problem (e.g., which can be solved, for small look-ahead times, on a quantum annealing quantum processing unit (QPU). For example, aspects of the techniques described herein may be implemented to improve efficiency of processes for loading stacks of shipping containers onto trucks (e.g., such as at terminals of a seaport).

Aspects described herein generally relate to techniques for establishing and solving an optimization problem involving trade-offs (e.g., trade-offs at least between prioritizing crane movement and prioritizing the wait time for trucks that have already arrived). According to some aspects of the described techniques, a cost function of the optimization problem reflects both of these concerns (e.g., a cost function is described that penalizes crane movement, rewards clearing of containers, etc.).

Among other advantages, the methods and systems described may result in increased port operation efficiency, improved container flow, etc.

Figure 1:
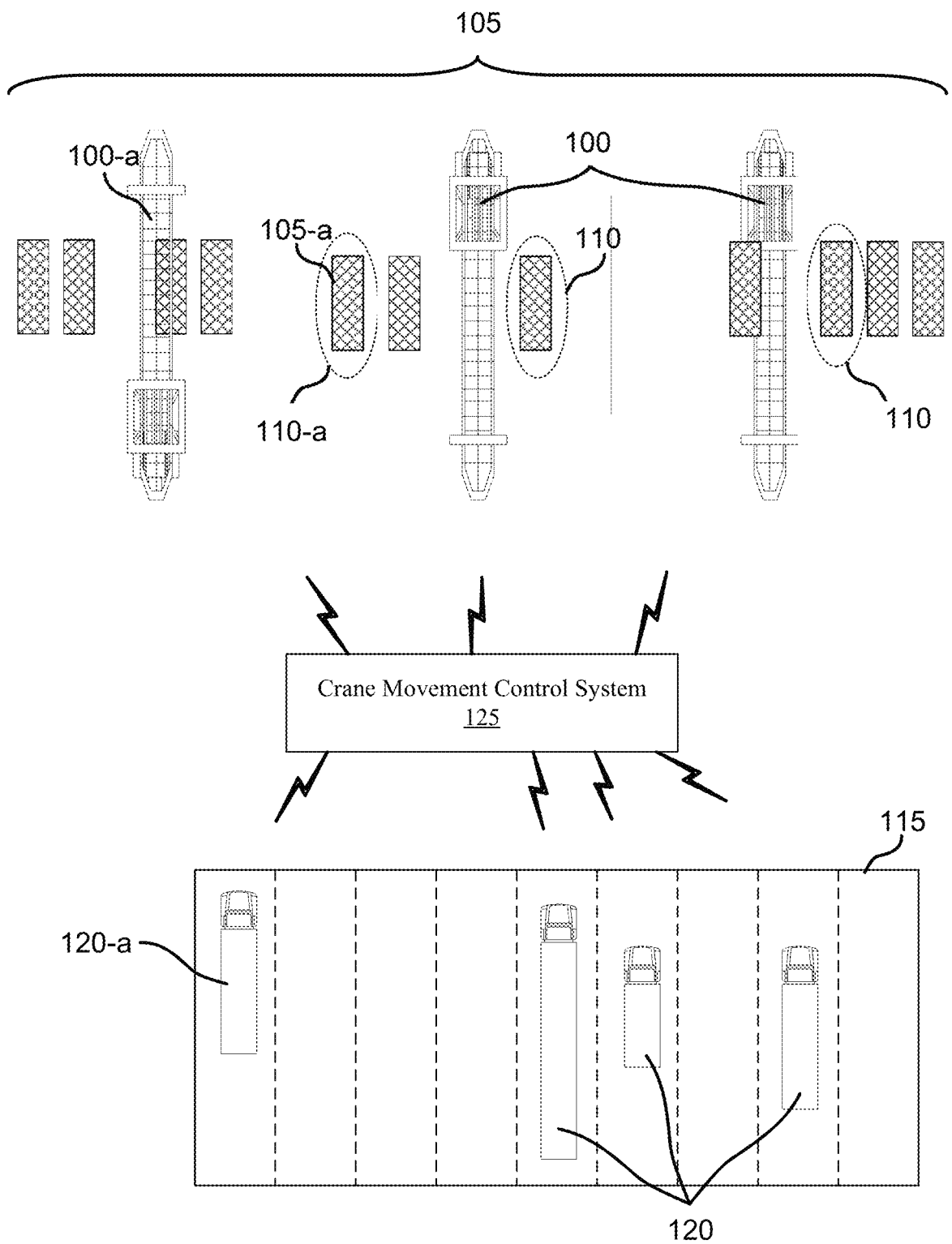
FIG. 1 shows an example of a shipping container delivery system according to aspects of the present disclosure.

FIG. 1 shows an example of a shipping container delivery system according to aspects of the present disclosure. The example shown includes crane 100, containers 105, bay position 110, parking area 115, truck 120, and crane movement control system 125.

In the example shipping container delivery system of FIG. 1, containers 105 (e.g., or container stacks) may be arranged in a row of containers 105. In some examples, a number of containers 105 may correspond to a bay position 110 along a row of containers 105. In some examples, a bay position 110 may include or refer to an area of a port, an area accessible by a crane 100, an area where one or more containers 105 are stored and accessed, a loading zone (e.g., a truck loading zone), etc.

In some cases (e.g., at the beginning of each day), there are a number of appointments for incoming trucks 120 to arrive to pick up specific containers 105 located at specific bay positions 110. The containers 105 are loaded onto the trucks 120 via large movable cranes 100 (e.g., Rubber Tire Gantries (RTGs)) that straddle the rows and move along them.

For instance, in the example shipping container delivery system of FIG. 1, a truck 120-*a* may be scheduled to receive a certain container 105-*a* to be delivered from a crane 100-*a*. The truck 120-*a* may arrive (e.g., and wait) in a parking area 115, along with other trucks 120. Based on a time window associated with the scheduling, the truck 120-*a* may be scheduled to arrive at a bay position 110-*a* and the crane 110-*a* may deliver the container 105-*a* to the truck 120-*a*.

In many cases, the number of trucks 120, containers 105, and cranes 100 in the system may be numerous, and efficient scheduling of container deliveries may be desired. For example, movement of cranes 100 and delay of truck 120 loading may result in operational expenses, wasted time, etc. The techniques described herein result in improved crane operation and container 105 loading, which may save energy, reduce operational expenses, improve truck 120 utilization, etc.

The techniques described herein provide a QUBO optimization problem, for example, for truck 120 dispatches to cranes 100 (e.g., for a crane 100 to load a truck 120) based on QUBO weights (qubit) to minimize cost, as well as based on QUBO strengths (qubit couplings) to "stiffen" the crane 100 movement somewhat against excessive zig-zagging by the crane 100 (e.g., QUBO weights may be implemented for efficient maneuvering of cranes 100, for example, based on previous movements of the cranes 100 for prior container 105 delivery operations). The value of future truck 120 arrivals is also added to the weights based on future truck 120 arrival probabilities.

As described herein, a cost function may penalize crane 100 movement, reward clearing of containers 105 at bays 110 with trucks 120 already available, and reward loading of containers 105 based on the difference between the current time and the truck 120 appointed truck arrival time. An initial cost function may be chosen to obtain the trial solution via a greedy algorithm. For example, for this implementation, a dependence on the truck 120 waiting time may be assumed in the cost function and the cost to move from bay $b_i$ to $b_j$ by $|j-i|$ may be weighted. Hence, a cost function for a move between truck loadings at $b_i$ and $b_j$ may be used, where the cost function is defined by:

$$C_{i,j}(t) = C \cdot |j-i| - R_j \cdot (t - \tau_j)$$

For example, in the cost function above, t is the current time, C is a constant cost parameter, $R_1$ is the reward for the j-th truck, and $\tau_j$ is the actual arrival time for the j-th truck (e.g., assumed to be currently in holding).

Techniques described herein may be implemented to efficiently estimate or determine the number of containers 105 with available trucks 120 at a given time. For example, trucks 120 may be given appointments to pick up particular containers 105 at a particular time (e.g., with a 2 hour grace period). In some cases (e.g., about 5% of cases), a truck 120 never arrives (e.g., to the parking area 115 in order to retrieve a scheduled container 105). However, in some cases, most trucks 120 may usually arrive within the appointed window. Arrival time data from trucks 120 already in port (e.g., in parking area 115) may be used to project ahead a certain amount of time given the expected arrival times and statistical distributions for the truck 120 arrivals. As such, the statistical expected value of the cost function may be used (e.g., which results from using the cumulative arrival distribution for each truck).

Crane movement control system 125 is an example of, or includes aspects of, the corresponding element described with reference to FIGS. 2 and 5. According to some aspects, crane movement control system 125 may communicate (e.g., wired or wirelessly) with one or more cranes 100, one or more containers 105, one or more trucks 120, parking area 115, or any combination thereof (e.g., via location receiver 205, data storage system 210, loading queue 215, processing system 220, crane communication system 225, truck communication system 230, etc. described with reference to FIG. 2).

According to some aspects, crane movement control system 125 receives a schedule of probable truck 120 arrival times. In some examples, crane movement control system 125 determines probable future truck 120 arrival times as a function of the schedule. In some examples, crane movement control system 125 detects a truck 120 within a predefined proximity of an operating area, where the truck 120 is assigned a container 105. In some examples, crane movement control system 125 determines a container location (e.g., or bay position 110) of the container 105. In some examples, crane movement control system 125 determines a crane location (e.g., or bay position 110) of a crane 100 proximate to the container 105. In some examples, crane movement control system 125 assigns the container 105 to the crane 100.

In some examples, crane movement control system 125 determines, using a quadratic unconstrained binary optimization system, where the quadratic unconstrained binary optimization system solves a non-deterministic polynomial time problem, an order to serve of the container 105 for the crane 100 as a function of cost and service objectives. In some examples, determining the order to serve the container 105 for the crane 100 includes: determining an initial guess of the order to serve, determining a set of weights based on the initial guess, determining a set of strengths as a function of a stiffness factor, determining a set of biases as a function of the set of weights and the set of strengths, and generating a revision of the order to serve as a function of the initial guess and the set of weights.

In some examples, crane movement control system 125 determines, repeatedly, a number of trucks 120 in a queue for the crane 100. In some examples, crane movement control system 125 determines, repeatedly, a set of available queue slots for the crane 100 by comparing the number of trucks 120 in the queue with a queue size. In some examples, crane movement control system 125 orders the queue, where the ordering defines a path vector for movement of the crane 100 as a function of locations of containers 105 assigned to trucks 120 in the queue.

In some examples, crane movement control system 125 selects, repeatedly, a lowest order truck 120 from the set of available queue slots and not yet called to the crane 100. In some examples, crane movement control system 125 transmits, when the truck 120 is the lowest order truck 120, a call message to the truck 120, where the call message includes the container location. In some examples, crane movement control system 125 moves, when the truck 120 is the lowest order truck 120, the crane 100 to the container location. In some examples, crane movement control system 125 delivers, in response to the truck 120 arriving at the container location (e.g., or bay position 110), the container 105 to the truck 120 using the crane 100.

Figure 2:
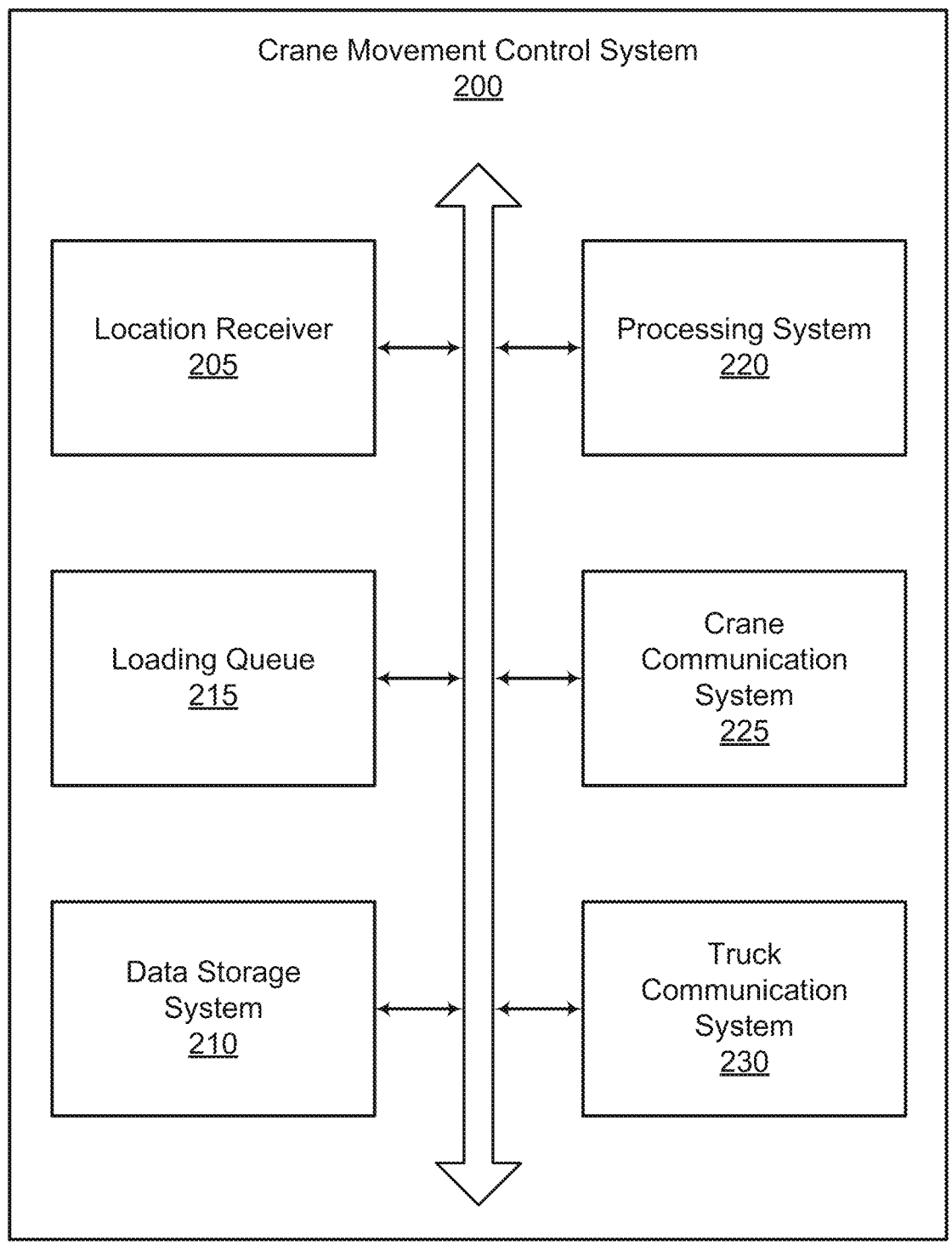
FIG. 2 shows an example of a crane movement control system according to aspects of the present disclosure.

FIG. 2 shows an example of a crane movement control system 200 according to aspects of the present disclosure. Crane movement control system 200 is an example of, or includes aspects of, the corresponding element described with reference to FIGS. 1 and 5. In one aspect, crane movement control system 200 includes location receiver 205, data storage system 210, loading queue 215, processing system 220, crane communication system 225, and truck communication system 230.

According to some aspects, location receiver 205 is configured to receive a location signal from a location sensor coupled to a truck, wherein the location sensor detects a truck location of the truck within a predefined proximity of an operating area and generates the location signal in response to the truck location.

According to some aspects, data storage system 210 is coupled to the location sensor, wherein the data storage system 210 receives the truck location, wherein the data storage system 210 comprises a container location for a container assigned to the truck.

According to some aspects, loading queue 215 is coupled to the data storage system 210, wherein the loading queue 215 comprises a list of trucks located with the predefined proximity, wherein the list of trucks comprises the truck, wherein the list of trucks is ordered from a lowest order truck to a highest order truck.

According to some aspects, processing system 220 is coupled to the loading queue 215 comprising a quadratic unconstrained binary optimization system, wherein the quadratic unconstrained binary optimization system solves a non-deterministic polynomial time problem configured to determine an order for the list of trucks and update the order in response to receipt of the truck location, wherein the order defines a path vector for movement of the crane as a function of locations of containers assigned to trucks on the list of trucks, wherein determining the order for the list of trucks comprises: determining an initial guess of the order to serve, determining a plurality of weights based on the initial guess, determining a plurality of strengths as a function of a stiffness factor, determining a plurality of biases as a function of the plurality of weights and the plurality of strengths, and generating a revision of the order to serve as a function of the initial guess and the plurality of weights.

According to some aspects, crane communication system 225 is coupled to the processing system 220 configured to communicate to a crane communications device onboard the crane when the truck is the lowest order truck, wherein a crane communication to the crane communications device directs the crane to load the container when the truck arrives at the crane.

According to some aspects, truck communication system 230 is coupled to the processing system 220 configured to communicate to a truck communications device onboard the truck when the truck is the lowest order truck, wherein a truck communication to the truck communications device onboard the truck indicates that the truck should proceed to the crane.

In some examples, crane movement control system 200 may include (or be included in) a computing device. A computing device may include a personal computer, laptop computer, mainframe computer, palmtop computer, personal assistant, mobile device, or any other suitable processing apparatus.

In some cases, crane movement control system 200 includes one or more processors to perform or execute one or more aspects described herein. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

In some cases, crane movement control system 200 includes one or more memory device to perform or execute one or more aspects described herein. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some cases, crane movement control system 200 includes (or communicates with) one or more databases to perform or execute one or more aspects described herein. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

In some cases, crane movement control system 200 includes (or communicates with) a cloud to perform or execute one or more aspects described herein. A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

In some cases, crane movement control system 200 includes and/or executes software to perform one or more aspects described herein. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

In some cases, crane movement control system 200 includes (or communicates using) a transceiver to perform or execute one or more aspects described herein. A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets for transmission, and to demodulate received packets. In some examples, transceiver may be tuned to operate at specified frequencies. For example, a modem can configure the transceiver to operate at a specified frequency and power level based on the communication protocol used by the modem.

Figure 3:
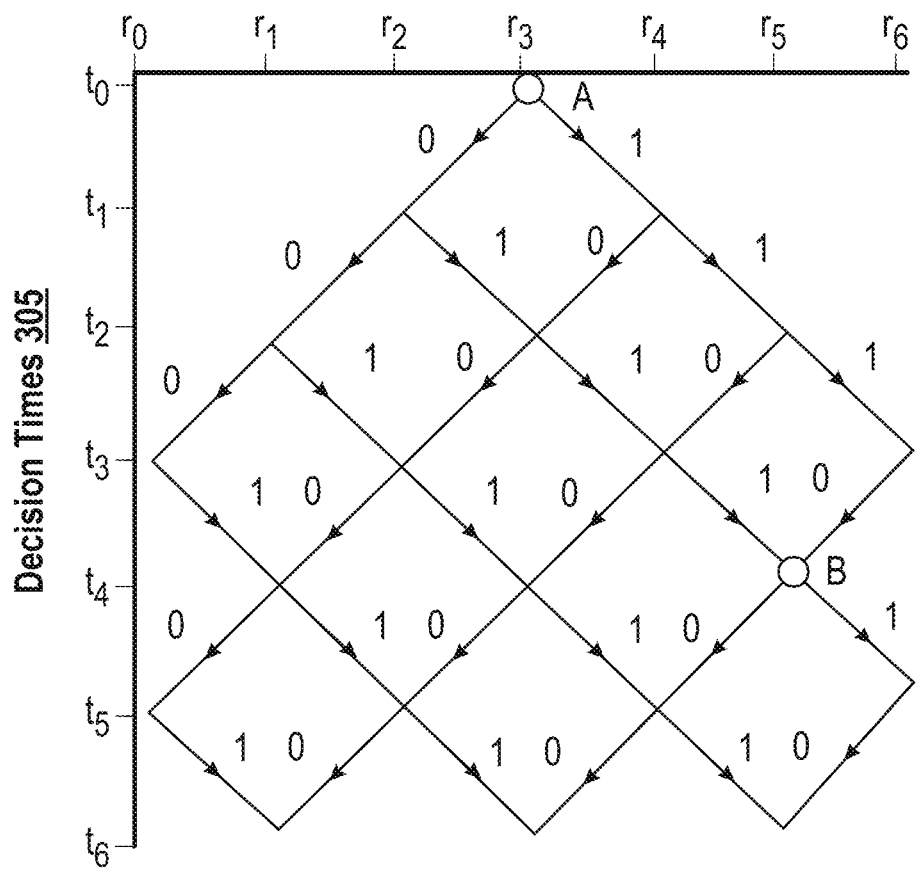
FIG. 3 shows an example of a decision path tree according to aspects of the present disclosure.

FIG. 3 shows an example of a decision path tree according to aspects of the present disclosure. The example shown includes bay positions 300 and decision times 305. In some examples, bay positions 300 may include or refer to aspects of bay positions 110 described with reference to FIG. 1. In some aspects, FIG. 3 may illustrate a decision path tree starting from bay position $r_3$ and following every time steps from $t_0$ to $t_6$. In one example, a choice of $x_i=1$ corresponds to a step to the right in state space, and $x_i=0$ corresponds to a step to the left.

For a sequence of n binary (e.g., yes/no, right/left, etc.) choices at sequence $T_n$ of predetermined times, $T_n = (t_1, t_2, \ldots, t_n)$, choices at each decision time can be represented by an N-dimensional sequence of binary variables, $\vec{x}=(x_1, x_2, \ldots, x_n): x_i \in \{0,1\}$. In some examples, $x_i \in \{-1,1\}$ (or some other binary choice) may be chosen for the QUBO formulation. In some examples, a standard binary form may be chosen for the QUBO formulation. In some aspects, the complement of each choice may be denoted with an overbar (e.g., $\vec{\bar{x}}_i \equiv 1-x_i$).

A sequence of these binary decisions for crane row moves may be described as a simple binary tree. For instance, vectors or sequences of the binary variables may be used to describe "paths" which include the history of decisions and corresponding crane positions at each time. The crane positions may be described (e.g., represented) by an N-dimensional vector, $R_N(t_i)=(r_0(t_i), r_1(t_i), \ldots, r_N(t_i))$ at each time $t_i$ in the sequence $T_n$. Beginning with some initial position $r_i(t_0)$, a sequence of choices between consecutive states may generate a binary tree.

For instance, in FIG. 3, starting from state $s_3$ at time $t_0$, a series of binary decisions may be made at each time step (e.g., which will move to either $s_4$ if the decision corresponding to $x_0=1$ is made or to state $s_2$ if $x_0=0$ is chosen). Thus, the choice at each step is given by the binary variable $x_i$ at each the time $t_i$. Each possible path at time step i may also be described by a unique i-dimensional binary vector $P_k$ ($t_i$), where k is the integer corresponding to $P_k$ interpreted as a binary number. For example, in FIG. 3, there are four "space-time" paths between the initial state A=$(s_3, t_0)$ and state B=$(s_5, t_4)$. These paths are:

$P_7(t_4)=(0,1,1,1) P_{11}(t_4)=(1,0,1,1); P_{13}(t_4)=(1); P_{14}(t_4)= (1,1,1,0).$

After a time $t_N$, the history in decision space can be described by the unique path vector $(x_0, x_1, x_2, \ldots, x_N)$. At any time $t_i$ there may be up to $2^i$ paths. However, there may be boundary conditions (e.g., such as those in FIG. 3 at $r_0$ and $r_6$ due to the finite size limits of the state space $R_N$), which may reduce the number of bays that may be visited and therefore reduce the number of paths.

Figure 4:
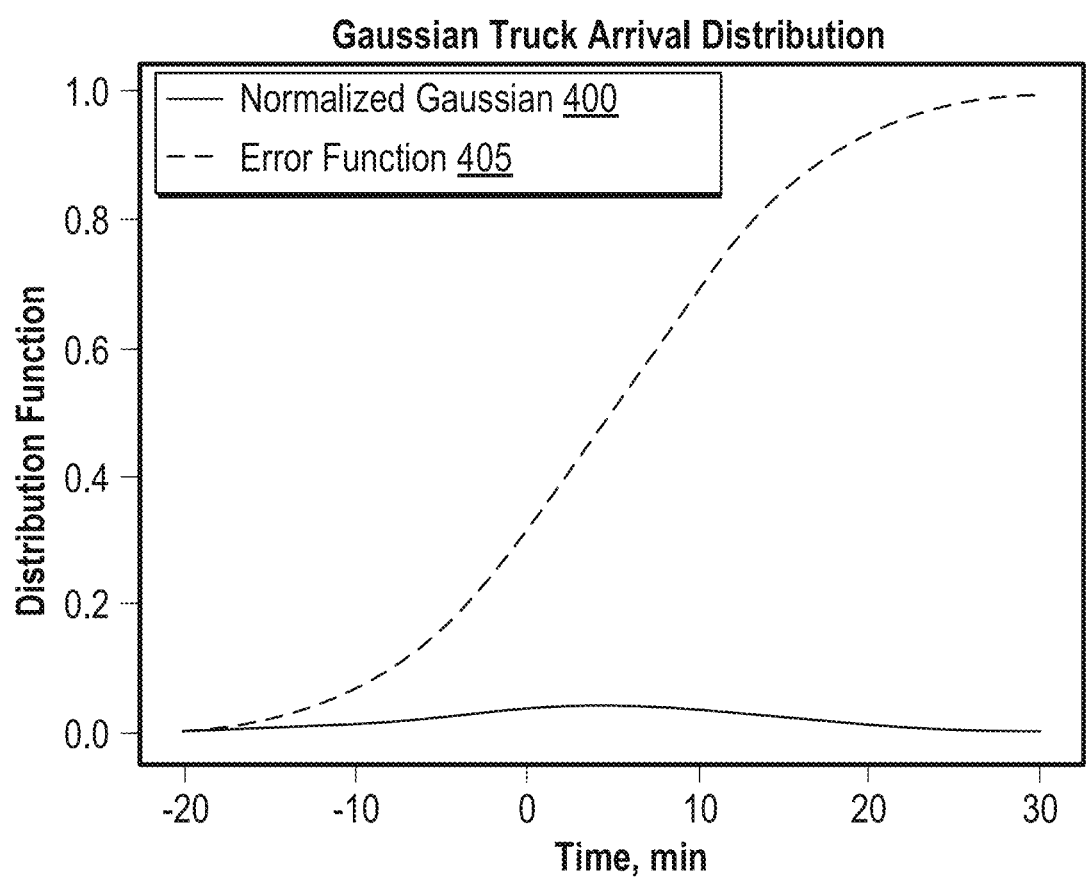
FIG. 4 shows an example of a truck arrival distribution according to aspects of the present disclosure.

FIG. 4 shows an example of a truck arrival distribution according to aspects of the present disclosure. The example shown includes normalized Gaussian distribution function 400 and error function 405.

According to techniques described herein, truck arrival times may be assumed to be governed by a statistical distribution centered close to the appointment times. In some examples, a Gaussian distribution may be assumed, where the Gaussian is centered at the appointment time or shifted slightly, with a width and center based on average arrival time data. Alternatively, a top hat function can be assumed, where the top hat function starts at the arrival time and lasts through the grace period. In either case, the cumulative distribution function from $t_0$ to $t_i$, which is gotten by integrating the arrival distribution over time from $-\infty$ to $t_i$, may be determined or estimated. Such will give an expected value for the truck arrival (e.g., such as the effective "fraction" of each future truck to have arrived by time).

FIG. 4 may show aspects of the cumulative distribution function (CDF) arrival fractions (e.g., or arrival probability) assuming a Gaussian distribution of arrival times. Plots of these distributions and cumulative distributions are shown in FIG. 4. A certain truck is expected to arrive 5 minutes after some time 0 (which is arbitrary, because this may be computed at any time during the day). It is assumed that the trucks are known to arrive with a typical variance or standard deviation of 5 min. For example, the cumulative probability of the truck arrival out to around 30 minutes from time 0 may be predicted in the example plot of FIG. 4.

In FIG. 4, a Gaussian distribution with $\mu=5$, and a $\sigma=5$ is modeled. For trucks which have not already arrived, the CDF corresponding to that particular truck and its associated container may be used to predict the average arrival "fraction" of that truck over some predictive time window. This may be used in the cost function, since the expectation of the cost function linear in the number of trucks may be the same function of the expectation value of the number of trucks at each bay.

The number of containers expected to be loadable (with trucks in holding) at bay i ready to be loaded at time t may be denoted by $v_i(t)$. If there are no future truck loading events, the expected number may be taken to be:

$$v_i^0(t) = v_i^0(t_0) + \sum_{j=0}^{n_i} \int_{t_0}^{t} dt' f_{i,j}(t') = v_i^0(t_{k-1}) + \sum_{j=0}^{N_i} \int_{t_{k-1}}^{t} dt' f_{i,j}(t'),$$

In expression above, the function $f_{i,j}(t)$ refers to the arrival time distribution for the truck for the j-th container at the i-th bay, with other parameters suppressed. The upper sum limit $N_i$ is the number of appointed containers in each bay. This arrival probability (CDF) is first computed and provided to a system that creates the QUBO and calls the QPO.

In some examples, the values of $v^0_i(t_k) \forall t_k \in T_N$ may be precomputed and tabulated for all bay numbers i. For example, Table 1 gives a list of assigned truck appointments for containers in each bay, with their arrival times (e.g., assuming that the port opens at 8:00 am).

TABLE 1

| Arrival Time Schedule for Four Bays | | |
|---|---|---|
| Bay Number | Assigned Truck | Arrival Time |
| 0 | 1 | 08:00 |
|  | 2 | 08:30 |
| 12 | 1 | 08:00 |
|  | 2 | 08:15 |
|  | 3 | 08:30 |
| 17 | 1 | 08:00 |
|  | 2 | 08:15 |
| 22 | 1 | 08:00 |
|  | 2 | 08:00 |
|  | 3 | 08:15 |
|  | 4 | 08:15 |
|  | 5 | 08:30 |

Table 2 shows the expected future value of active containers in each bay at a series of decision times. For simplicity, a regular sequence of move decision times may be assumed (e.g., which in the example of Table 2 is every 5 minutes), starting from 08:00 am and running until 08:30 am. For this model, the trucks arrival on average at their appointment times can be assumed to be ±5 minutes. It may also be assumed that the arrival times may be adequately modeled with a Top Hat distribution with a width of 10 minutes, centered around the appointment time.

TABLE 2

Container number expected values
(as a function of time)

| Decision time, $t_i$ | $v_0^0(t_i)$ | $v_{12}^0(t_i)$ | $v_{17}^0(t_i)$ | $v_{22}^0(t_i)$ |
|---|---|---|---|---|
| 08:00 | 0.5 | 0.5 | 0,5 | 1.0 |
| 08:05 | 1.0 | 1.0 | 1.0 | 2.0 |
| 08:10 | 1.0 | 1.0 | 1.0 | 2.0 |
| 08:15 | 1.0 | 1.5 | 1.5 | 3.0 |
| 08:20 | 1.0 | 2.0 | 2.0 | 3.0 |
| 08:25 | 1.0 | 2.0 | 2.0 | 3.0 |
| 08:30 | 1.5 | 2.5 | 2.0 | 3.5 |

Figure 5:
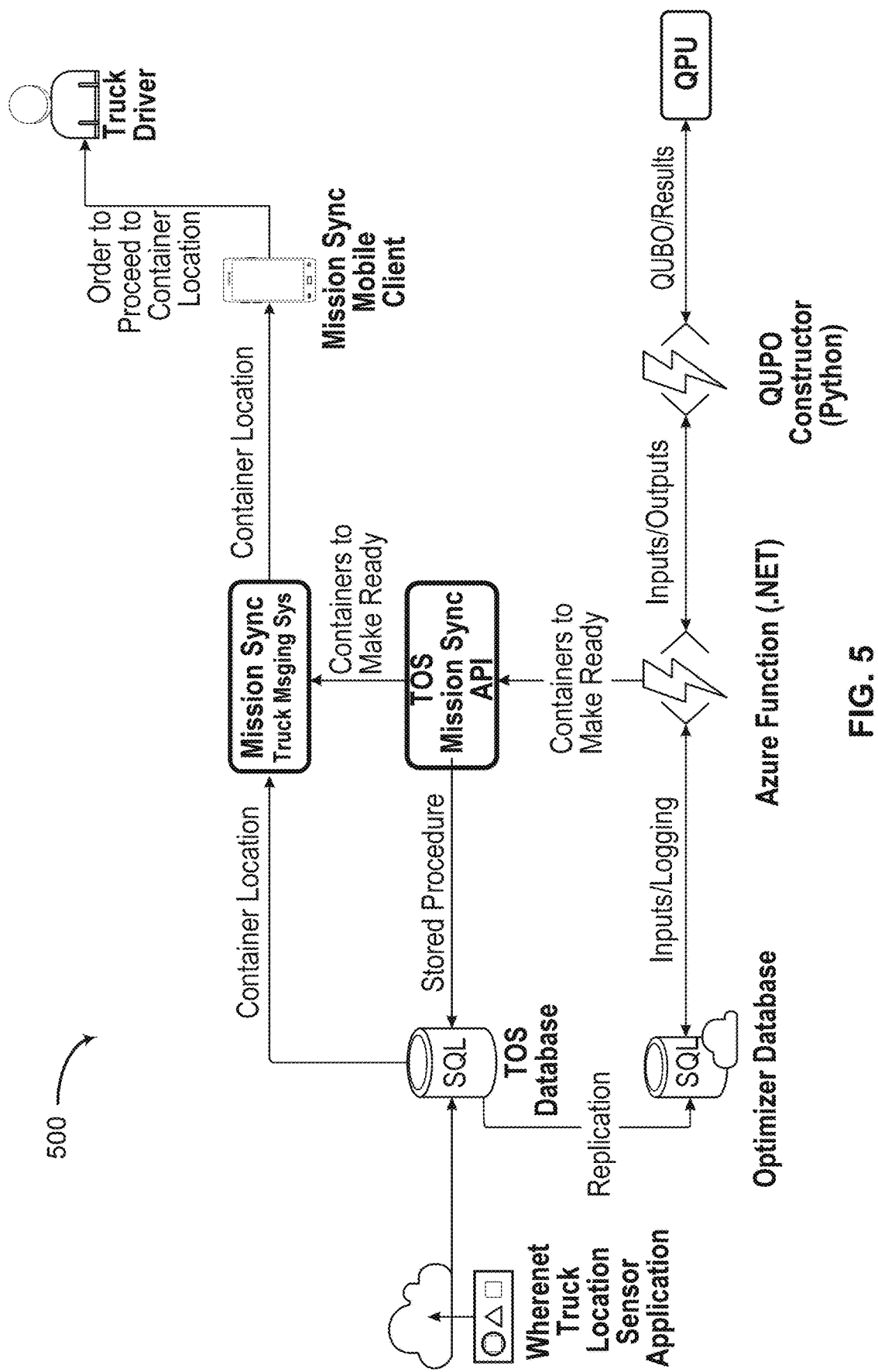
FIG. 5 shows an example of a shipping container delivery system according to aspects of the present disclosure.

FIG. 5 shows an example of a shipping container delivery system according to aspects of the present disclosure. In some aspects, crane movement control system 500 is an example of, or includes aspects of, the corresponding element described with reference to FIGS. 1 and 2.

In some examples, the crane movement control system 500 may receive, as inputs, crane location bays, waiting container bays, and waiting container minutes. Further, according to the techniques described herein, crane movement control system 500 may output QPU Availability Check and an ordered list of containers to serve (e.g., that minimizes cost).

In some examples of the techniques described herein, an optimization problem and solution may include two steps, an initial guess and a QUBO solution. An initial guess may include a produced initial trial solution for a most efficient path using only the available trucks in holding using a greedy algorithm. This gives a list of container (or truck) delivery assignments that approximately minimizes the cost function. The QUBO solution may include a QUBO corresponding to the initial solution generated by first setting the QUBO weights appropriately to generate that sequence of moves. Next, future arrivals may be accounted for, and zig-zag motions of the crane may be reduced or minimized by modifications to the QUBO weights and strengths. Future arrivals may be accounted for by computing total Left and right biases relative to the starting bay and adding reward contributions for all trucks with current arrival probabilities greater than a certain parameter, $p_{min}$ These biases are added to the initial QUBO weights for each time step. The QUBO "strengths" are used to minimize zig-zag movements of the crane using a "stiffness" factor, which goes into the off-diagonal component of the QUBO matrix.

The qubits, $q_i$, correspond to the decision variables $x_i$. For example, if considering M decision steps, there will be M qubits. In some examples, $q_i=1$ may correspond to "move right", and $q_i=0$ may correspond to "move left". The weights for the qubits at each time are the sum of the (horizontal) rows in the decision tree for that "time". Because of our choice for left/right movements, the rightward moves are added and the leftward moves are subtracted in the cost function, then multiplied by −1. The "strength" parameters are nearest-neighbor couplings. Long excursions may already be penalized in the cost function, however crane direction switching may also be penalized by adding a nearest-neighbor coupling penalty of $b_{i,j}q_iq_j$, where $b_{i,j}<0$.

In some examples, results may be obtained using $b_{i,j}=-1$. In some implementations, techniques described herein may be used to decide the next truck to call (e.g., such that the closest truck in the direction with the most predicted moves may be chosen). As described herein, such can be computed from the QUBO, $$H = \sum_{i=1}^{n_t} a_i q_i + \sum_{j \neq i}^{n_t} b_{i,j} q_i q_j,$$

where, $$a_i = A_i \text{ (greedy)} + (L - R)$$

$$L = r_f \sum_{j=1}^{i-1} \Theta(p_j - p_{min}) \cdot p_j$$

$$R = r_f \sum_{j=i}^{n} \Theta(p_j - p_{min}) \cdot p_j$$

$$b_{i,j} = -1.$$

Here, $r_f$ is a "future reward" parameter and $\Theta(p_j-p_{min})$ is a step function. The "lookahead time" is determined from the greedy trial solution, so the "lookahead time" is fixed by the size of that solution for trucks that are in holding. For a reasonable lookahead time, $n_t$ may be fairly small (e.g., such that the QUBO may be efficiently solved). The next truck to call can be decided by averaging a small number of initial terms in the returned binary solution vector and rounding (e.g., in some implementations, 3 or 5 may be used).

One or more aspects of the techniques described herein may be generalized to other statistical algorithms (e.g., along the lines of a Markov Decision Process or Dynamic Programming algorithm) that could predict the expectations (e.g., if predictive information is available).

Figure 6:
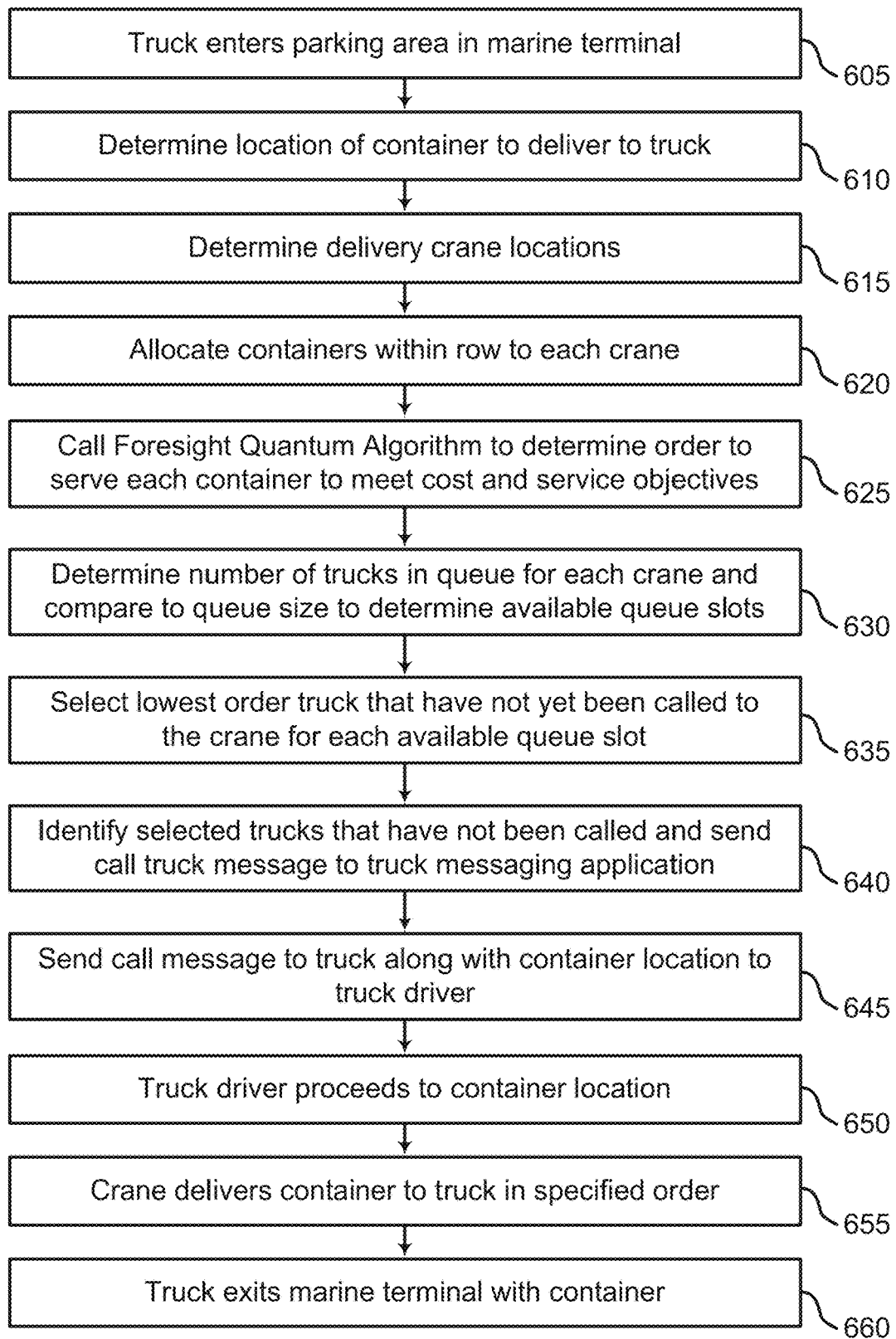
FIG. 6 shows an example of a method for scheduling delivery of shipping containers according to aspects of the present disclosure.

FIG. 6 shows an example of a method 600 for scheduling delivery of shipping containers according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a truck enters a parking area in marine terminal. In some cases, the operations of this step refer to, or may be performed by, a truck and parking area as described with reference to FIG. 1.

At operation 610, the system determines location of container to deliver to truck (e.g., an algorithm determines a location of a container to deliver to a truck). In some cases, the operations of this step refer to, or may be performed by, a crane movement control system as described with reference to FIGS. 1, 2, and 5.

At operation 615, the system determines delivery crane locations (e.g., an algorithm determines delivery crane locations). In some cases, the operations of this step refer to, or may be performed by, a crane movement control system as described with reference to FIGS. 1, 2, and 5.

At operation 620, the system allocates containers within a row (e.g., equally within each row) to each crane. In some cases, the operations of this step refer to, or may be performed by, a crane movement control system as described with reference to FIGS. 1, 2, and 5. In some cases, the operations of this step refer to, or may be performed by, a crane as described with reference to FIG. 1.

At operation 625, the system calls Foresight Quantum Algorithm to determine order to serve each container to meet cost and service objectives (e.g., an algorithm calls a Foresight Quantum Algorithm to determine an order to serve each container to meet cost and service objectives). In some cases, the operations of this step refer to, or may be performed by, a crane movement control system as described with reference to FIGS. 1, 2, and 5.

At operation 630, the system determines number of trucks in queue for each crane and compare to queue size to determine available queue slots (e.g., an algorithm determines a number of trucks in a queue for each crane and compares the number to queue size to determine available queue slots). In some cases, the operations of this step refer to, or may be performed by, a crane movement control system as described with reference to FIGS. 1, 2, and 5.

At operation 635, the system selects lowest order truck that have not yet been called to the crane for each available queue slot (e.g., for each, available queue slot, algorithm selects lowest order truck, selected trucks, that have not yet been called to the crane). In some cases, the operations of this step refer to, or may be performed by, a crane movement control system as described with reference to FIGS. 1, 2, and 5.

At operation 640, the system identifies selected trucks that have not been called and send call truck message to truck messaging application (e.g., a messaging function identifies selected trucks that have not been called and sends a call truck message to truck messaging application). In some cases, the operations of this step refer to, or may be performed by, a truck communication system as described with reference to FIG. 2.

At operation 645, the system sends call message to truck along with container location to truck driver (e.g., a truck messaging application sends call message to truck along with container location to a truck driver via a mobile phone application). In some cases, the operations of this step refer to, or may be performed by, a truck communication system as described with reference to FIG. 2.

At operation 650, the truck proceeds to the indicated container location. In some cases, the operations of this step refer to, or may be performed by, a truck as described with reference to FIG. 1.

At operation 655, the crane delivers the container to the truck in the specified order. In some cases, the operations of this step refer to, or may be performed by, a crane as described with reference to FIG. 1.

At operation 660, the truck exits the marine terminal with container. In some cases, the operations of this step refer to, or may be performed by, a truck as described with reference to FIG. 1.

Figure 7:
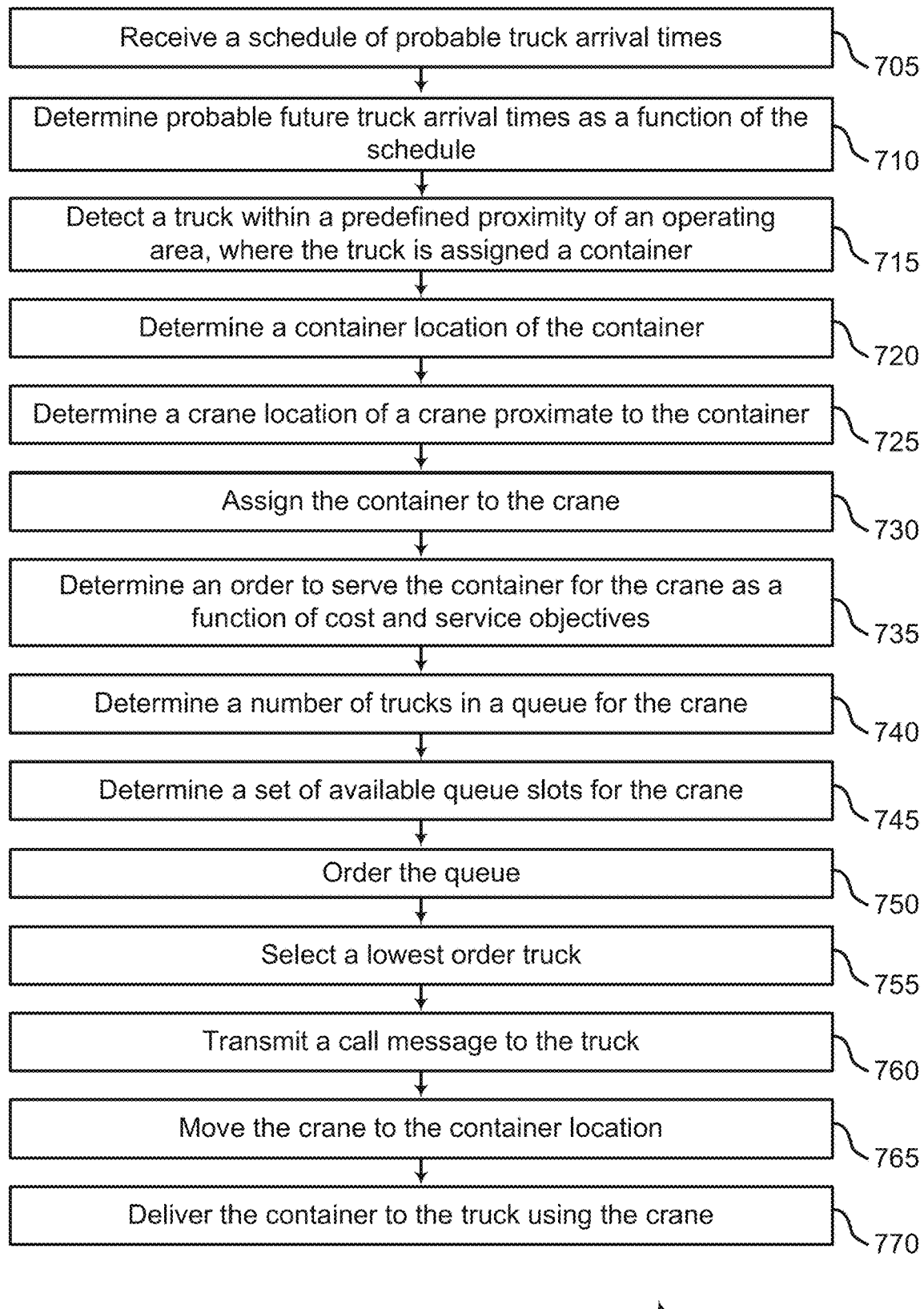
FIG. 7 shows an example of a method for controlling crane movement according to aspects of the present disclosure.

FIG. 7 shows an example of a method 700 for controlling crane movement according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives a schedule of probable truck arrival times. In some cases, the operations of this step refer to, or may be performed by, a crane movement control system as described with reference to FIGS. 1, 2, and 5.

At operation 710, the system determines probable future truck arrival times as a function of the schedule. In some cases, the operations of this step refer to, or may be performed by, a crane movement control system as described with reference to FIGS. 1, 2, and 5.

At operation 715, the system detects a truck within a predefined proximity of an operating area, where the truck is assigned a container. In some cases, the operations of this step refer to, or may be performed by, a crane movement control system as described with reference to FIGS. 1, 2, and 5.

At operation 720, the system determines the container location. In some cases, the operations of this step refer to, or may be performed by, a crane movement control system as described with reference to FIGS. 1, 2, and 5.

At operation 725, the system determines a crane location of a crane proximate to the container. In some cases, the operations of this step refer to, or may be performed by, a crane movement control system as described with reference to FIGS. 1, 2, and 5.

At operation 730, the system assigns the container to the crane. In some cases, the operations of this step refer to, or may be performed by, a crane movement control system as described with reference to FIGS. 1, 2, and 5.

At operation 735, the system determines, using a quadratic unconstrained binary optimization system, where the quadratic unconstrained binary optimization system solves a non-deterministic polynomial time problem, an order to serve the container for the crane as a function of cost and service objectives. In some cases, the operations of this step refer to, or may be performed by, a crane movement control system as described with reference to FIGS. 1, 2, and 5.

At operation 740, the system determines, repeatedly, a number of trucks in a queue for the crane. In some cases, the operations of this step refer to, or may be performed by, a crane movement control system as described with reference to FIGS. 1, 2, and 5.

At operation 745, the system determines, repeatedly, a set of available queue slots for the crane by comparing the number of trucks in the queue with a queue size. In some cases, the operations of this step refer to, or may be performed by, a crane movement control system as described with reference to FIGS. 1, 2, and 5.

At operation 750, the system orders the queue, where the ordering defines a path vector for movement of the crane as a function of locations of containers assigned to trucks in the queue. In some cases, the operations of this step refer to, or may be performed by, a crane movement control system as described with reference to FIGS. 1, 2, and 5.

At operation 755, the system selects, repeatedly, a lowest order truck from the set of available queue slots and not yet called to the crane. In some cases, the operations of this step refer to, or may be performed by, a crane movement control system as described with reference to FIGS. 1, 2, and 5.

At operation 760, the system transmits, when the truck is the lowest order truck, a call message to the truck, where the call message includes the container location. In some cases, the operations of this step refer to, or may be performed by, a crane movement control system as described with reference to FIGS. 1, 2, and 5.

At operation 765, the system moves, when the truck is the lowest order truck, the crane to the container location. In some cases, the operations of this step refer to, or may be performed by, a crane movement control system as described with reference to FIGS. 1, 2, and 5.

At operation 770, the system delivers, in response to the truck arriving at the container location, the container to the truck using the crane. In some cases, the operations of this step refer to, or may be performed by, a crane movement control system as described with reference to FIGS. 1, 2, and 5.

Figure 8:
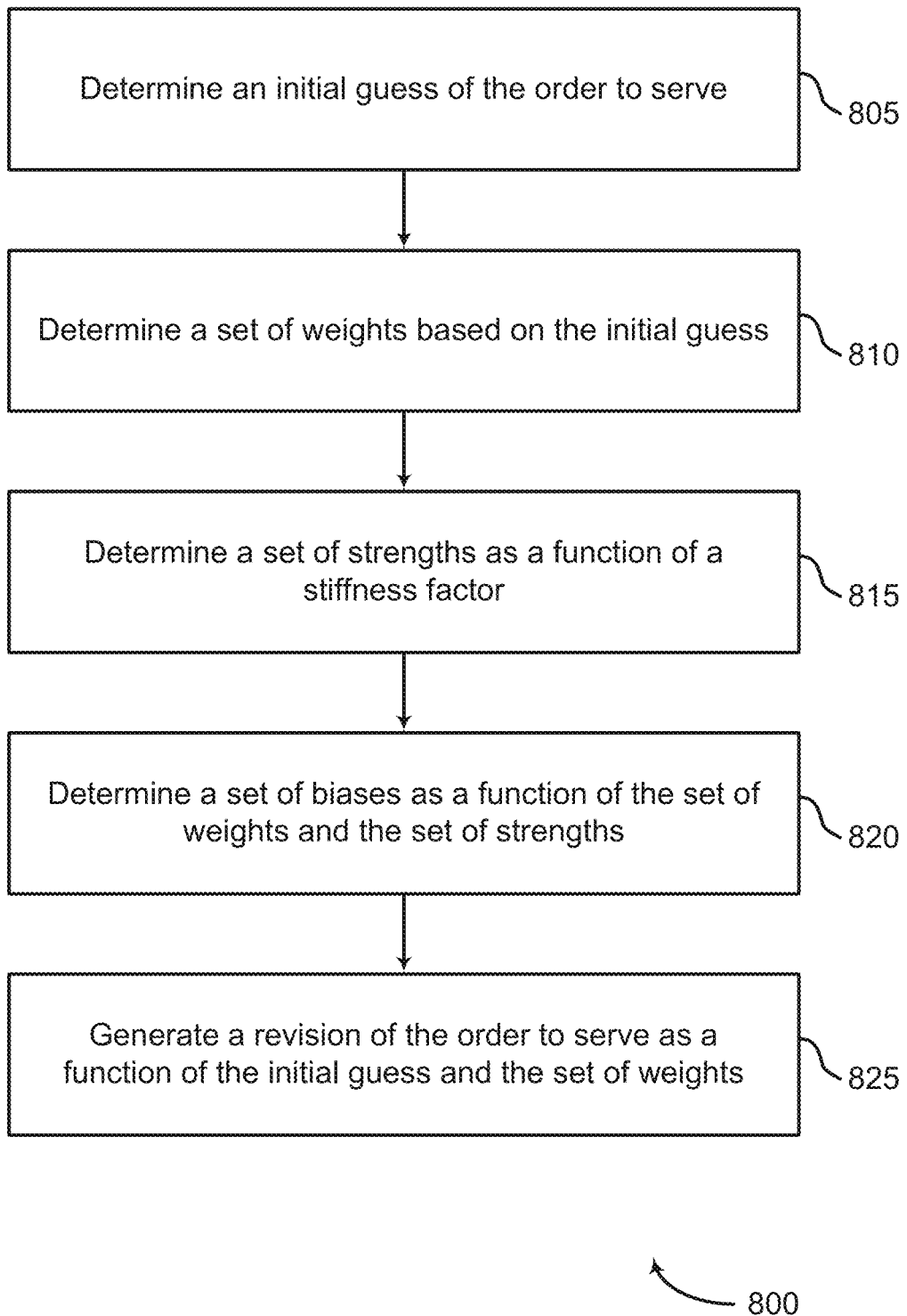
FIG. 8 shows an example of a method for determining an order to serve the container for the crane as a function of cost and service objectives according to aspects of the present disclosure.

FIG. 8 shows an example of a method 800 for determining an order to serve the container for the crane as a function of cost and service objectives according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some examples, method 800 may illustrate a process for determining an order to serve the container for the crane as a function of cost and service objectives (e.g., as described herein, for example, with reference to operation 735). For instance, in some aspects, method 800 may be performed based on a quadratic unconstrained binary optimization system, where the quadratic unconstrained binary optimization system solves a non-deterministic polynomial time problem.

At operation 805, the system determines an initial guess of the order to serve. In some cases, the operations of this step refer to, or may be performed by, a crane movement control system as described with reference to FIGS. 1, 2, and 5.

At operation 810, the system determines a set of weights based on the initial guess. In some cases, the operations of this step refer to, or may be performed by, a crane movement control system as described with reference to FIGS. 1, 2, and 5.

At operation 815, the system determines a set of strengths as a function of a stiffness factor. In some cases, the operations of this step refer to, or may be performed by, a crane movement control system as described with reference to FIGS. 1, 2, and 5.

At operation 820, the system determines a set of biases as a function of the set of weights and the set of strengths. In some cases, the operations of this step refer to, or may be performed by, a crane movement control system as described with reference to FIGS. 1, 2, and 5.

At operation 825, the system generates a revision of the order to serve as a function of the initial guess and the set of weights. In some cases, the operations of this step refer to, or may be performed by, a crane movement control system as described with reference to FIGS. 1, 2, and 5.

Figure 9:
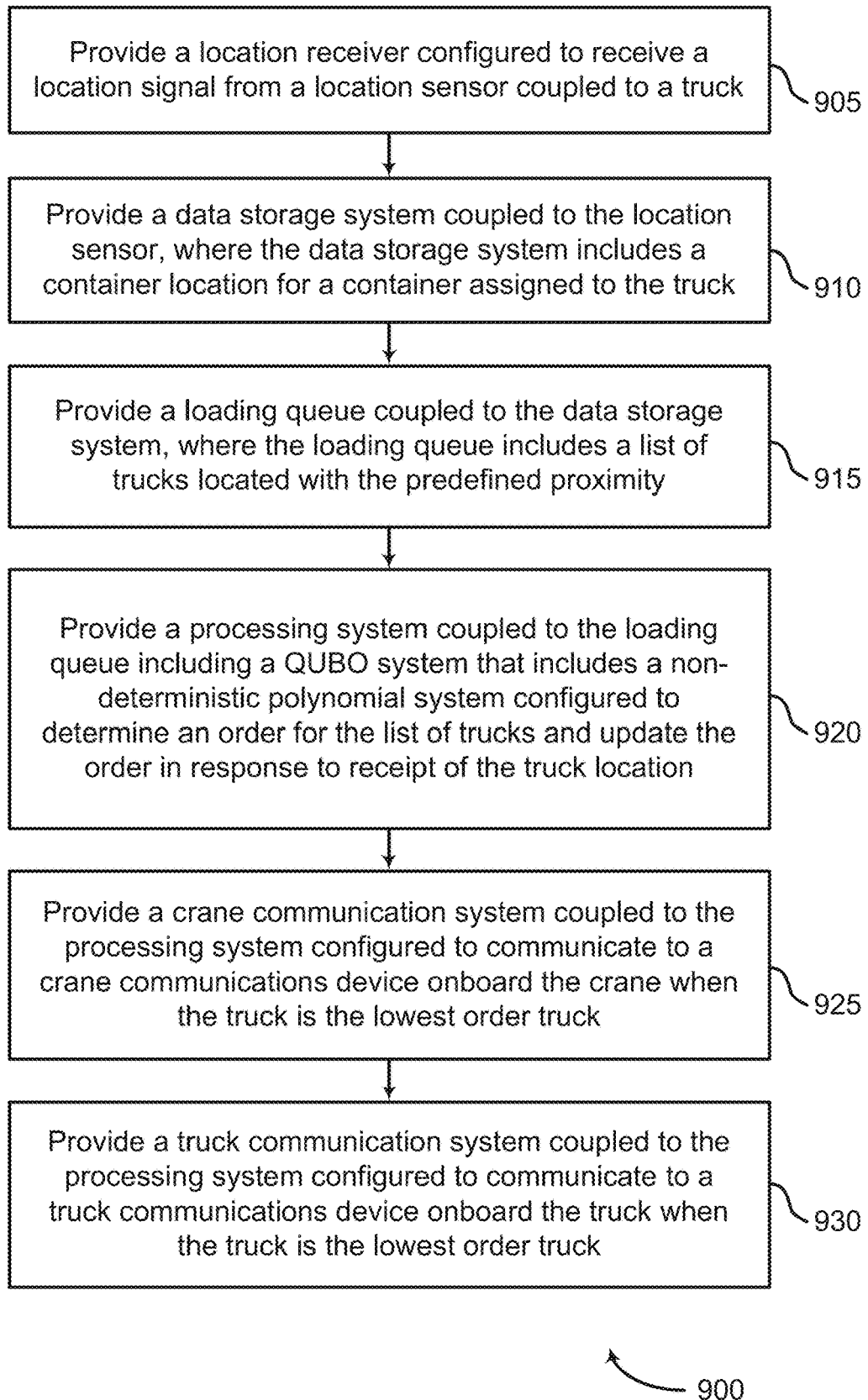
FIG. 9 shows an example of a method for controlling crane movement according to aspects of the present disclosure.

FIG. 9 shows an example of a method 900 for controlling crane movement according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system provides a location receiver configured to receive a location signal from a location sensor coupled to a truck, where the location sensor detects a truck location of the truck within a predefined proximity of an operating area and generates the location signal in response to the truck location. In some cases, the operations of this step refer to, or may be performed by, a location receiver as described with reference to FIG. 2.

At operation 910, the system provides a data storage system coupled to the location sensor, where the data storage system receives the truck location, where the data storage system includes a container location for a container assigned to the truck. In some cases, the operations of this step refer to, or may be performed by, a data storage system as described with reference to FIG. 2.

At operation 915, the system provides a loading queue coupled to the data storage system, where the loading queue includes a list of trucks located with the predefined proximity, where the list of trucks includes the truck, where the list of trucks is ordered from a lowest order truck to a highest order truck. In some cases, the operations of this step refer to, or may be performed by, a loading queue as described with reference to FIG. 2.

At operation 920, the system provides a processing system coupled to the loading queue including a quadratic unconstrained binary optimization system, where the quadratic unconstrained binary optimization system solves a non-deterministic polynomial time problem configured to determine an order for the list of trucks and update the order in response to receipt of the truck location, where the order defines a path vector for movement of the crane as a function of locations of containers assigned to trucks on the list of trucks, where determining the order for the list of trucks includes: determining an initial guess of the order to serve, determining a set of weights based on the initial guess, determining a set of strengths as a function of a stiffness factor, determining a set of biases as a function of the set of weights and the set of strengths, and generating a revision of the order to serve as a function of the initial guess and the set of weights. In some cases, the operations of this step refer to, or may be performed by, a processing system as described with reference to FIG. 2.

At operation 925, the system provides a crane communication system coupled to the processing system configured to communicate to a crane communications device onboard the crane when the truck is the lowest order truck, where a crane communication to the crane communications device directs the crane to load the container when the truck arrives at the crane. In some cases, the operations of this step refer to, or may be performed by, a crane communication system as described with reference to FIG. 2.

At operation 930, the system provides a truck communication system coupled to the processing system configured to communicate to a truck communications device onboard the truck when the truck is the lowest order truck, where a truck communication to the truck communications device onboard the truck indicates that the truck should proceed to the crane. In some cases, the operations of this step refer to, or may be performed by, a truck communication system as described with reference to FIG. 2.

Accordingly, the present disclosure includes the following aspects.

A method for controlling crane movement is described. One or more aspects of the method include receiving a schedule of probable truck arrival times; determining probable future truck arrival times as a function of the schedule; detecting a truck within a predefined proximity of an operating area, wherein the truck is assigned a container; determining a container location of the container; determining a crane location of a crane proximate to the container; assigning the container to the crane; and determining, using a quadratic unconstrained binary optimization system, an order to serve the container for the crane as a function of cost and service objectives.

In some examples, determining the order to serve the container for the crane as a function of cost and service objectives comprises: determining an initial guess of the order to serve, determining a plurality of weights based on the initial guess, determining a plurality of strengths as a function of a stiffness factor, determining a plurality of biases as a function of the plurality of weights and the plurality of strengths, and generating a revision of the order to serve as a function of the initial guess and the plurality of weights.

One or more aspects of the method further include determining, repeatedly, a number of trucks in a queue for the crane; determining, repeatedly, a set of available queue slots for the crane by comparing the number of trucks in the queue with a queue size; ordering the queue, wherein the ordering defines a path vector for movement of the crane as a function of locations of containers assigned to trucks in the queue; selecting, repeatedly, a lowest order truck from the set of available queue slots and not yet called to the crane; transmitting, when the truck is the lowest order truck, a call message to the truck, wherein the call message includes the container location; moving, when the truck is the lowest order truck, the crane to the container location; and delivering, in response to the truck arriving at the container location, the container to the truck using the crane.

An apparatus for controlling crane movement is described. One or more aspects of the apparatus include a location receiver configured to receive a location signal from a location sensor coupled to a truck, wherein the location sensor detects a truck location of the truck within a predefined proximity of an operating area and generates the location signal in response to the truck location; a data storage system coupled to the location sensor, wherein the data storage system receives the truck location, wherein the data storage system comprises a container location for a container assigned to the truck; a loading queue coupled to the data storage system, wherein the loading queue comprises a list of trucks located with the predefined proximity, wherein the list of trucks comprises the truck, wherein the list of trucks is ordered from a lowest order truck to a highest order truck; and a processing system coupled to the loading queue comprising a quadratic unconstrained binary optimization system.

In some examples, the quadratic unconstrained binary optimization system solves a non-deterministic polynomial time problem configured to determine an order for the list of trucks and update the order in response to receipt of the truck location, wherein the order defines a path vector for movement of the crane as a function of locations of containers assigned to trucks on the list of trucks, wherein determining the order for the list of trucks comprises: determining an initial guess of the order to serve, determining a plurality of weights based on the initial guess, determining a plurality of strengths as a function of a stiffness factor, determining a plurality of biases as a function of the plurality of weights and the plurality of strengths, and generating a revision of the order to serve as a function of the initial guess and the plurality of weights.

One or more aspects of the apparatus further include a crane communication system coupled to the processing system configured to communicate to a crane communications device onboard the crane when the truck is the lowest order truck, wherein a crane communication to the crane communications device directs the crane to load the container when the truck arrives at the crane; and a truck communication system coupled to the processing system configured to communicate to a truck communications device onboard the truck when the truck is the lowest order truck, wherein a truck communication to the truck communications device onboard the truck indicates that the truck should proceed to the crane.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for controlling crane movement comprising:
receiving, by a crane movement control system comprising a location receiver, a processing system including at least one computing device and at least one quantum processing unit, a crane communication system, a truck communication system, a data storage system including at least one database, and a loading queue coupled to and in communication with the data storage system, a schedule of probable truck arrival times;
determining, by the crane movement control system, probable future truck arrival times as a function of the schedule;
detecting, by the crane movement control system a truck within a predefined proximity of an operating area, wherein the truck is assigned a container;
determining, by the crane movement control system, a container location of the container;

determining, by the crane movement control system, a crane location of a crane proximate to the container;

assigning, by the crane movement control system, the container to the crane;

determining, by the crane movement control system using a quadratic unconstrained binary optimization system run on the at least one quantum processing unit, wherein the quadratic unconstrained binary optimization system solves a non-deterministic polynomial time problem, an order to serve of said container for said crane as a function of cost and service objectives, comprising:
  determining an initial guess of the order to serve,
  determining a plurality of weights based on the initial guess,
  determining a plurality of strengths as a function of a stiffness factor,
  determining a plurality of biases as a function of the plurality of weights and the plurality of strengths, and
  generating a revision of the order to serve as a function of the initial guess and the plurality of weights;

determining, repeatedly by the crane movement control system, a number of trucks in the loading queue for the crane;

determining, repeatedly by the crane movement control system, a set of available queue slots for the crane by comparing the number of trucks in the loading queue with a queue size;

ordering, by the crane movement control system, the loading queue, wherein the ordering defines a path vector for movement of the crane as a function of locations of containers assigned to trucks in the loading queue;

selecting, repeatedly by the crane movement control system, a lowest order truck from the set of available queue slots and not yet called to the crane;

transmitting, by the crane movement control system, when the truck is the lowest order truck, a call message to the truck, wherein the call message includes the container location;

moving, when the truck is the lowest order truck, the crane to the container location; and delivering, in response to the truck arriving at the container location, the container to the truck using the crane.

2. A system for controlling crane movement comprising:

a location receiver configured to receive a location signal from a location sensor coupled to a truck, wherein the location sensor detects a truck location of the truck within a predefined proximity of an operating area and generates the location signal in response to the truck location;

a data storage system including at least one database and coupled to the location sensor, wherein the data storage system receives the truck location, wherein the data storage system comprises a container location for a container assigned to the truck;

a loading queue coupled to and in communication with the data storage system, wherein the loading queue comprises a list of trucks located within the predefined proximity, wherein the list of trucks comprises the truck, wherein the list of trucks is ordered from a lowest order truck to a highest order truck;

a processing system coupled to the loading queue comprising at least one computing device and a quadratic unconstrained binary optimization system comprising at least one quantum processing unit, wherein the quadratic unconstrained binary optimization system solves a non-deterministic polynomial time problem configured to determine an order to serve for the list of trucks and update the order to serve in response to receipt of the truck location, wherein the order defines a path vector for movement of the crane as a function of locations of containers assigned to trucks on the list of trucks, wherein determining the order to serve for the list of trucks by the quadratic unconstrained binary optimization system comprises:
  determining an initial guess of the order to serve,
  determining a plurality of weights based on the initial guess,
  determining a plurality of strengths as a function of a stiffness factor,
  determining a plurality of biases as a function of the plurality of weights and the plurality of strengths, and
  generating a revision of the order to serve as a function of the initial guess and the plurality of weights;

a crane communication system coupled to the processing system configured to communicate to a crane communications device onboard the crane when the generated revision of the order to serve lists the truck as the lowest order truck, wherein a crane communication from the crane communication system to the crane communications device directs the crane to load the container when the truck arrives at the crane; and a truck communication system coupled to the processing system configured to communicate to a truck communications device onboard the truck when the generated revision of the order to serve lists the truck as the lowest order truck, wherein a truck communication from the truck communication system to the truck communications device onboard the truck indicates that the truck should proceed to the crane.

3. A system for logistics management, comprising:

means for receiving a location signal from a location sensor coupled to a truck, wherein the location sensor detects a truck location of the truck within a predefined proximity of an operating area and generates the location signal in response to the truck location;

means for receiving a schedule of probable truck arrival times;

means for determining probable future truck arrival times as a function of the schedule;

means for detecting a truck within a predefined proximity of an operating area, wherein the truck is assigned a container;

means for determining a container location of the container;

means for determining a crane location of a crane proximate to the container;

means for assigning the container to the crane;

means for determining, using a quadratic unconstrained binary optimization system comprising at least one quantum processing unit, wherein the quadratic unconstrained binary optimization system solves a non-deterministic polynomial time problem, an order to serve of said container for said crane as a function of cost and service objectives, comprising:

determining an initial guess of the order to serve, determining a plurality of weights based on the initial guess, determining a plurality of strengths as a function of a stiffness factor, determining a plurality of biases as a function of the plurality of weights and the plurality of strengths, and generating a revision of the order to serve as a function of the initial guess and the plurality of weights;

means for determining, repeatedly, a number of trucks in a loading queue for the crane, wherein the truck is included in the number of trucks and each truck in the loading queue is assigned a container;

means for determining, repeatedly, a set of available queue slots for the crane by comparing the number of trucks in the queue with a queue size;

means for ordering the queue, wherein the ordering defines a path vector for movement of the crane as a function of locations of containers assigned to trucks in the queue;

means for selecting, repeatedly, a lowest order truck from the set of available queue slots and not yet called to the crane;

means for transmitting, when the truck is the lowest order truck, a call message to the truck, wherein the call message includes the container location;

means for moving, when the truck is the lowest order truck, the crane to the container location; and means for delivering, in response to the truck arriving at the container location, the container to the truck using the crane.

4. A system for shipping container scheduling using quadratic unconstrained binary optimization, the system comprising:

a location sensor coupled to a truck, wherein the location sensor detects a truck location of the truck within a predefined proximity of an operating area and generates a location signal in response to the truck location;

a location receiver configured to receive the location signal from the location sensor;

a data storage system including at least one database and coupled to the location sensor, wherein the data storage system receives the truck location, wherein the data storage system comprises a container location for a container assigned to the truck;

a loading queue coupled to the data storage system, wherein the loading queue comprises a list of trucks located within the predefined proximity, wherein the list of trucks comprises the truck, wherein the list of trucks is ordered from a lowest order truck to a highest order truck;

a processing system coupled to the loading queue comprising at least one computing device and a quadratic unconstrained binary optimization system comprising at least one quantum processing unit, wherein the quadratic unconstrained binary optimization system solves a non-deterministic polynomial time problem configured to determine an order to serve for the list of trucks and update the order in response to receipt of the truck location, wherein the order to serve defines a path vector for movement of the crane as a function of locations of containers assigned to trucks on the list of trucks, wherein determining the order to serve for the list of trucks by the quadratic unconstrained binary optimization system comprises: determining an initial guess of the order to serve, determining a plurality of weights based on the initial guess, determining a plurality of strengths as a function of a stiffness factor, determining a plurality of biases as a function of the plurality of weights and the plurality of strengths, and generating a revision of the order to serve as a function of the initial guess and the plurality of weights;

a crane communication system coupled to the processing system configured to communicate to a crane communications device onboard the crane when the generated revision of the order to serve lists the truck as the lowest order truck, wherein a crane communication from the crane communication system to the crane communications device directs the crane to load the container when the truck arrives at the crane; and a truck communication system coupled to the processing system configured to communicate to a truck communications device onboard the truck when the generated revision of the order to serve lists the truck as the lowest order truck, wherein a truck communication from the truck communication system to the truck communications device onboard the truck indicates that the truck should proceed to the crane.

\* \* \* \* \*